March 19, 1968     P. J. MILLER     3,374,322

DUAL BRAKE SYSTEM SAFETY DEVICE

Filed Oct. 6, 1966

INVENTOR.
PAUL J. MILLER
BY
McNENNY, FARRINGTON, PEARNE & GORDON
ATTORNEYS

United States Patent Office 3,374,322
Patented Mar. 19, 1968

3,374,322
DUAL BRAKE SYSTEM SAFETY DEVICE
Paul J. Miller, Maple Heights, Ohio, assignor to The Weatherhead Company, a corporation of Ohio
Filed Oct. 6, 1966, Ser. No. 584,780
3 Claims. (Cl. 200—82)

ABSTRACT OF THE DISCLOSURE

A dual brake system including a switch operable to produce a signal responsive to a pressure unbalance between the two fluid lines. The switch includes a bore containing a piston assembly exposed to the two pressures at opposite ends. The piston assembly has two sealing members spaced apart by a spacer having two end walls and a portion of reduced diameter between them. The piston assembly constitutes one switch element and is centered by means of springs so that upon a pressure unbalance the piston assembly moves from a centered position causing one of the end walls to engage a second switch contact in the form of a stud projecting into the bore to complete the electric circuit and produce the signal. The sealing members engage the spacer only near the axis so that cocking forces produced by contact between the spacer end walls and the stud are not transmitted to the sealing members.

---

Figure 1:
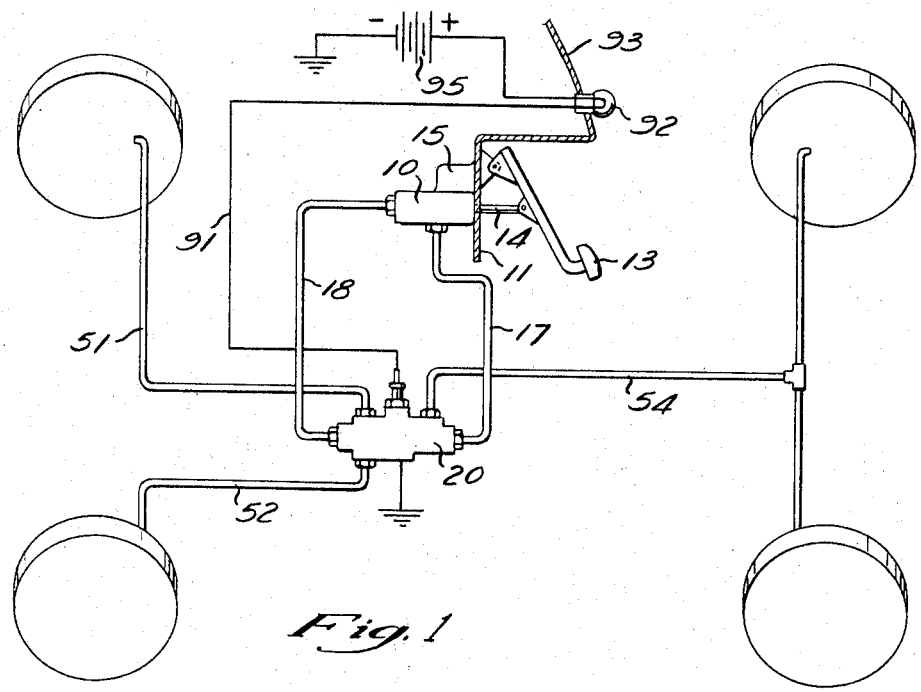

This invention relates generally to hydraulic brake systems and more specifica'ly to dual hydraulic systems having two separate hydraulic circuits for actuating separate brakes such as the front and rear brakes of an automobile.

Hydraulic actuation of the service brakes of automobiles has become almost universal at the present time because of the advantages presented by the equalized actuation of the brakes at the different wheels because of the substantially uniform pressure throughout the system during brake actuation. These systems give balanced operation together with low cost and high efficiency and readily lend themselves to power assistance either by means of fluid pressure intensifiers or fluid motors acting on the master cylinder actuating linkage. However, such hydraulic systems have the drawback that if a leak develops any place in the system, then there will be a loss of fluid pressure throughout the system so that the brakes will no longer be operable. Also, such a leak can quickly result in the loss of all of the hydraulic fluid, which also leaves the system inoperable.

In order to overcome this problem, it has been proposed that the hydraulic system be divided into two separate circuits independent of each other but actuated by a single pedal. Thus, the master cylinder can be either a single cylinder having two axially spaced pistons therein to define two separate chambers, or two separate cylinders in which the pistons are actuated by a common linkage.

Because hydraulic brake systems must provide high stopping power under high energy dissipation conditions such as high speed stops, they have a capacity for stopping power which is only used to a minimal extent under low speed gradual stops such as are involved in traffic and suburban driving. In these conditions, it is possible for the operator of a vehicle having a dual system to stop the vehicle by using only one of the brake systems without noticing that the other one is inoperative. Thus, the driver many continue to use the automobile without notice of the brake system failure until an emergency situation is encountered.

To overcome this problem it has been proposed that an arrangement be provided to give a visual or other suitable signal to the vehicle operator upon a failure in either of the hydraulic brake circuits. It has been proposed that this be done by means of a pressure responsive switching device which is independent of the absolute pressures in the systems and functions only upon a pressure unbalance between the two circuits which exceeds a predetermined limit. One unit suitable for providing an electric signal in response to a predetermined pressure unbalance has been shown in the co-pending application of John A. Turchan, Ser. No. 561,128, filed June 28, 1966.

In this co-pending application, the signaling unit is provided with a longitudinal bore which is exposed to fluid pressure at each end from the two different hydraulic circuits. A pair of pistons are mounted in this bore and are spaced apart by a central projection on one of the pistons. Springs on the outboard ends of the pistons bias them norma.ly to a center position and the pistons carry seals to make sealing contact with the bore walls to prevent fluid leakage past the pistons and insure a sufficient pressure build-up on the outer sides of the pistons corresponding to that in the respective hydraulic systems. Thus, the pistons will shift away from the centered position against the biasing springs with a movement proportional to the pressure unbalance between the two hydraulic circuits. In order to provide an electric signal, the pistons themselves serve as one of the switch elements and if they have shifted a sufficient distance, they engage a projecting stud switch member which extends radially into the bore and is insulated from the body so as to complete an electric circuit so that a signal may be provided to the vehicle operator by lighting a lamp on the dashboard of the vehicle.

The present invention provided an improved arrangement giving longer life and greater reliability in a signaling unit such as that disclosed in said co-pending application Ser. No. 561,128. According to the present invention, the pistons are spaced apart axially by means of a generally spool shaped member of unitary construction having a center section of reduced diameter which spaces apart two end sections having a diameter substantially equal to that of the bore and making sliding contact therewith. This arrangement insures that electrical contact to the body of the housing can be made by the direct metal to metal sliding contact of the spacer member to avoid the problems encountered by having the sealing ring on the piston which necessarily tends to center the piston and space it away from actual contact with the housing. This spacer member makes the actual contact with the stud and since this contact is only on one side of the spool, the applied axial force as a result of the hydraulic pressure tends to produce a cocking action which the opposite end of the spool must resist by its engagement with the bore. Since the spool is free to align itself in the bore independently of the pistons, any such cocking action is not transferred to the pistons and therefore avoids any scoring or damage to the walls of the bore in the area over which the sealing rings carried by the piston must pass. Thus, by virtue of the unitary construction and the space between the end portions of the spacer, these cocking forces are greatly reduced and are not transferred to the pistons. Also, the radial forces applied to the bore wall are applied at an area which the sealing portions carried by the pistons never contact so that any deterioration or damage to the walls by the spacer will not cause any corresponding damage to the seal. As a result of this arrangement, considerably longer life is obtained by preventing damage to the seals which would render the device inoperative and because the contacting spacer member makes direct contact with the bore, positive electrical contact is insured even at the low voltages encountered in automobile electric systems.

Figure 2:
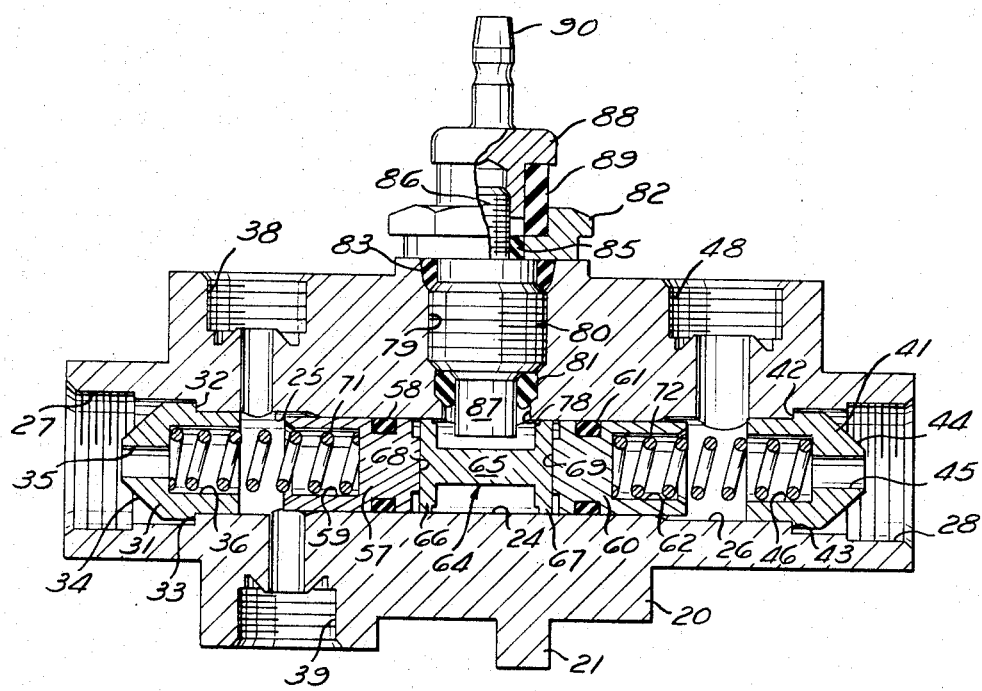

Further features and advantages of this invention will readily become apparent to those skilled in the art upon a more complete understanding of the preferred embodiment of the invention as described in the following detailed description and as shown in the accompanying drawings in which:

FIGURE 1 is a schematic view of a dual hydraulic brake system for an automobile incorporating the present invention; and FIGURE 2 is an enlarged cross-sectional view of the signaling unit shown in FIGURE 1.

Referring now to the drawings in greater detail, FIGURE 1 is a schematic showing of a braking system for an automobile in which a master cylinder 10 is mounted on the firewall 11 within the engine compartment and a pivotally mounted foot pedal 13 acts on a piston rod 14 to produce the hydraulic pressure necessary for actuating the brakes. A reservoir 15 on top of the master cylinder supplies hydraulic fluid and the master cylinder, being of the dual type, has two outlet lines 17 and 18 for two separate hydraulic brake circuits for the front wheels and the rear wheels of the automobile. It will be understood that the master cylinder 10 is arranged so that at all times, assuming no leakage in the system, the lines 17 and 18 will be provided with substantially the same fluid pressure as required to actuate the brakes in accordance with the pressure applied to the foot pedal 13.

The brake lines 17 and 18 lead to the switch of this invention shown in greater detail in FIGURE 2. The switch has a housing 20 which may be formed with a projecting lug 21 so that the housing may be mounted on a bracket or a portion of the vehicle frame in any suitable manner and to provide electrical grounding for completion of the electric circuit as described in greater detail hereinafter. The housing 20 has an axial bore 24 extending lengthwise therethrough, and at each end of the bore 24 are slightly enlarged counterbores 25 and 26 at the left and right ends respectively. A threaded inlet 27 is formed at the housing at the left counterbore 25 to receive the front brake line 18 from the master cylinder 10 by a suitable fitting such as the inverted flare type and, likewise, at the right end of counterbore 26 is a threaded inlet fitting 28 to which is connected the line 17 for the rear brakes of the vehicle.

Within the left counterbore 25 is mounted a plug 31 having a shoulder 32 which engages a mating shoulder 33 formed in the counterbore 25 to axially position the plug against inward movement into the counterbore. This plug may be a relatively loose fit in the counterbore and is positively positioned by the shoulders 32 and 33. The outer end of the plug is formed as a conical end 34 to receive an inverted flare type fitting for connection between the front brake line 18 and the inlet 27. The plug 31 is formed with a passage 35 therethrough which at its inner end opens into an enlarged recess 36 so that the fluid entering through the inlet 27 passes through the plug passage into the interior of the counterbore 25. A pair of fluid outlets 38 and 39 are formed in the housing 20 and are threaded to receive suitable fittings and open off the counterbore 25 so that they may be connected by lines 51 and 52 to the front wheel brakes.

In a similar manner, the right counterbore 26 is provided with a plug 41 having a shoulder 42 which abuts against a mating shoulder 43 in the counterbore. The plug 41 has a conical end 44 to receive an inverted flare type fitting and has an axial passage 45 therethrough which opens into a recess 46 on the inner end of the plug. It will be understood that plugs 31 and 41 are substantially identical in construction. Thus, the fluid for the rear brakes passes from the master cylinder through line 17 to the inlet 28 and from there to the passage 45 in the plug 41 into the counterbore 26. A suitable threaded outlet 48 opens off the counterbore 26 for connection to the rear wheel brakes through a suitable line 54.

Within the axial bore 24 inward of the counterbore 25 is located a left piston 57 which makes sealing contact with the bore by means of an O-ring seal 58 carried in a groove on the piston intermediate its ends. Likewise in the right end of the bore 24 inward of the counterbore 26 is a right piston 60 similar in construction to the piston 57 and making sealing contact with the bore 24 by an O-ring seal 61. At their outer ends facing the respective counterbores, the pistons 57 and 60 have cup shaped recesses 59 and 62 to provide an elongated skirt portion to increase the bearing surface against the sides of the bore 24 to minimize tipping or cocking of the pistons.

The pistons 57 and 60 are spaced apart by a spool shaped spacer 64 mounted in the axial bore 24 between the two pistons. The spacer 64 has a central axially extending portion 65 of a reduced diameter considerably less than that of the bore 24. At each end of the center section 65 the spacer 64 is provided with integral wall portions 66 and 67 which have parallel radially extending sides and an outer periphery making a loose clearance fit with the bore 24 to allow free sliding movement of the spacer 64 but with a minimum amount of clearance so as to prevent any cocking or tilting of the spacer for the reasons set forth in greater detail hereinafter. The pistons 57 and 60 each have reduced diameter projections 68 and 69, respectively, on the inner faces to engage the outer sides of the spool walls 66 and 67 so that the forces between the pistons and the spacer are applied substantially at a central or axial point rather than over the full face of the outer sides of the walls 66 and 67.

In order to bias the pistons 57 and 60 to a central position, helical compression biasing springs 71 and 72 are mounted between the pistons and the left and right plugs 31 and 41. Thus, the left spring 71 fits within the recess 36 in the plug 31 at the outer end and within the recess 59 in the piston 57 at the inner end. Likewise the right spring 72 extends between the piston recess 62 and the plug recess 46. Since the plugs 31 and 41 are firmly held in position by the fittings and the plugs when the unit is assembled in the brake system, these springs 71 and 72 provide equal biasing forces so as to insure that the pistons 57 and 60 and the spacer 64 will be centrally positioned within the bore 24.

When the unit is connected in a hydraulic brake system, as previously stated, the pressures coming from the master cylinder 10 through the lines 17 and 18 and communicated to inlets 27 and 28 are balanced, and therefore the pistons 57 and 60 being of the same diameter, will not move any substantial distance within the bore 24 unless the pressures in the lines 17 and 18 become unbalanced. This unbalance can result from a loss of fluid either upstream or downstream from the unit on either the front or rear brakes or a loss of fluid supply to the master cylinder affecting only one of the lines 17 and 18. In the event of such pressure unbalance indicating a failure of the corresponding set of brakes when pressure is applied to the master cylinder 10 by the foot pedal 13 the resulting higher pressure build-up at one of the inlets will cause the pistons 57 and 60 to shift against the corresponding biasing spring so as to shift the spacer 64 away from the center position in the bore.

The housing 20 is formed with a transverse bore 78 extending radially outward from the center of the axial bore 24 so as to be located midway between the walls 66 and 67 of the spacer 64 when in the centered position as determined by the biasing springs 71 and 72. At its outer end, the transverse bore 78 is provided with an enlarged threaded portion 79 to receive a plug member 80. The plug 80 is sealed to prevent leakage out of the bore 78 by means of an inner seal 81 at the inner end of the threaded portion 79 and the plug carries a radially extending flange 82 outward of the housing 20 to compress a seal ring 83 in the outer end of the threaded portion 79. The plug 80 is tubular and has within it an insulating sleeve 85 within which in turn is mounted an axially extending stud 86. The stud 86 extends into the axial bore 24 where it has a head portion 87 engageable by the spacer walls 66 and 67 when the spacer 64 moves from the central position. At its outer end the stud 86 is threadedly secured within a cap 88 insulated from the plug 80 by a suitable insulating ring 89. The cap 88 at its outer end has a terminal 90 which is connected by a wire 91 to an indicating lamp 92 mounted on the vehicle dashboard as indicated at 93. The lamp 92 is energized by the automobile battery 95 and since both the housing 20 and the one battery terminal are grounded, whenever contact is made between the stud 86 and the housing 20 the lamp 92 will light indicating that the braking system is faulty.

It will be understood that as long as the brake pressures in the lines 17 and 18 are substantially equal the assembly formed by the pistons 57 and 60 and the spacer 64 will remain substantially centered within the bore 24 by the springs 71 and 72 and the balanced hydraulic pressures within the counterbores 25 and 26. However, a drop in fluid pressure, as previously described, will cause the pistons 57 and 60 and the spacer 64 to shift together as a unit in the direction toward the lower pressure. When this is done, one of the walls 66 and 67 of the spacer 64 will make abutting contact with the stud head 87. In this case electrical contact may be made to the housing 20 either by the sliding engagement of the spacer walls 66 and 67 with the bore 24 or by contact to either of the pistons 57 and 60 and the respective centering springs 71 and 72, the plugs 31 and 41 to the housing 20. Because of the multiple arrangement for providing electrical conduction between the spacer 64 and the housing 20, and because the biasing springs and fluid pressures will always maintain the pistons 57 and 60 and the spacer 64 in contact as a unit, as long as the pressure unbalance between the counterbores 25 and 26 exceeds a predetermined amount determined by the biasing force of the springs 71 and 72, contact will be maintained and the lamp 92 lit to indicate the brake failure.

It will be understood that particularly in the case of a complete failure of one of the hydraulic systems, the total force applied by the spacer 64 to the stud head 87 can be equal to the maximum line pressure multiplied by the area of the bore 24. Because the spacer 64 is of unitary construction, the engagement of one of the walls 66 or 67 with the stud head 87 will produce, because of its unbalanced nature, a cocking force on the spacer 64. However, because the pressure contact force between the spacer and the pistons is applied only along the central axis, and because the walls 66 and 67 are spaced apart sufficiently so as to allow the cocking force to be taken up entirely by the spacer, substantially no forces are applied to the pistons 57 and 60 which tend to produce any cocking, which under sliding action of the pistons could cause excessive wear to the bore or piston surface. As a result, any wear within the portions of the bore 24 adjacent the walls 66 and 67, will not affect the sealing action of the O-ring seals 58 and 61, since they are positioned on the pistons 57 and 60 in such a manner that they will not, in either extreme position of the piston and spacer assembly, slide over the areas which are rubbed by the spacer walls 66 and 67. Thus, this arrangement insures a minimum of wear on both the bore and pistons and hence a high degree of reliability over a long cycle life in the event that the repair of the brake system is not taken care of immediately.

It is recognized that while the invention has been described in detail as being applied to a dual hydraulic brake system for motor vehicles, it is also applicable where a relative balance of fluid pressure is encountered in other hydraulic and pneumatic control systems of a dual nature, and such rearrangements and modifications as may become apparent to those skilled in the art upon an understanding of the invention may be resorted to without departing from the scope of the invention as defined in the claims.

What is claimed is:

1. A switch for use in dual fluid pressure systems comprising a housing having a bore therein, a first enlarged counterbore in said housing at one end of said bore, a second enlarged counterbore in said housing at the other end of said bore, at least one inlet to each of said counterbores, a first piston assembly mounted in said bore adjacent said first counterbore, a second piston assembly mounted in said bore adjacent said second counterbore, each of said pistons carrying a sealing ring intermediate the ends of the piston to make sealing contact with said bore, a unitary spacer member mounted in said bore between said first and second pistons, said spacer member making electrical contact with said housing, said spacer member having a center section of reduced diameter less than that of said bore, said spacer member having an end wall at each end of said center section having radially extending sides and an outer periphery slightly less than that of said bore to make sliding contact therewith, each of said pistons having a centrally located projection on the inner end adjacent said spacer so that force transmitting contact between the pistons and said spacer takes place only at a zone adjacent the axis of said bore, a switch member carried on said housing and extending radially into said bore intermediate said spacer member end walls and terminating a distance from said center portion of said spacer member, means electrically insulating said switch member from said housing, terminal means on the exterior of said housing electrically connected to said switch member and spring means including a compression spring in each counterbore to bias said first and second pistons and said spacer member to a center portion wherein said spacer member end walls are substantially equidistant from said switch member so that the pressure differential between said first and second counterbores is operable to shift said first and second pistons and said spacer member to cause an end wall of said spacer member to move into abutting electrical contact with said switch member and complete the electrical connection from said switch member to said spacer member to said housing.

2. A switch for use in a dual fluid pressure system comprising a housing having a bore therein, a first fluid inlet at one end of said bore, a second fluid inlet at the other end of said bore, a piston assembly slidably mounted in said bore between said first and second fluid inlets, said piston assembly including a first piston adjacent said first fluid inlet and a second piston adjacent said second fluid inlet, seal means on said first and second pistons to make sealing contact with said bore, a spacer member slidably mounted in said bore between said first and second pistons, said spacer member making electrical contact with said housing, said spacer member being an integral unitary piece separate from said first and second pistons to have a center portion of reduced diameter and a pair of end walls at each end of said center portion having an outer peripheral diameter slightly less than that of said bore, projection means on said piston assembly interspacing said spacer member and each of said pistons whereby force transmitting contact between said pistons and said spacer takes place only at a zone adjacent the longitudinal axis of said bore and spaced away from the walls of said bore, a stud projecting transversely into said bore intermediate said spacer member end walls and electrically insulated from said housing, spring means centering said piston assembly axially within said bore whereby in the absence of fluid pressure at said first and second inlets said stud will be located substantially equidistantly between said spacer member end walls and a pressure unbalance between said first and second inlets above a predetermined level will shift said piston assembly away from the inlet having the higher pressure to bring the adjacent spacer member end wall into abutting electrical contact with said stud to complete an electrical circuit between said stud, said spacer member and said housing.

3. A switch as set forth in claim 2 wherein said projection means are on each of said pistons adjacent said spacer member.

References Cited

UNITED STATES PATENTS

| | | | |
|---|---|---|---|
| 2,764,176 | 9/1956 | Darquier | 303—84 |
| 3,228,194 | 1/1966 | Blair | 303—84 |

BERNARD A. GILHEANY, *Primary Examiner.*

H. BROOME, *Assistant Examiner.*